United States Patent [19]

Tesney

[11] Patent Number: 5,404,828
[45] Date of Patent: Apr. 11, 1995

[54] RIM LOCK APPARATUS

[75] Inventor: Bobby Tesney, Haleyville, Ala.

[73] Assignee: Winston Furniture Company of Alabama, Inc., Birmingham, Ala.

[21] Appl. No.: 45,902

[22] Filed: Apr. 12, 1993

[51] Int. Cl.⁶ .............................................. A47B 17/00
[52] U.S. Cl. ...................................... 108/27; 108/157; 248/188; 403/320
[58] Field of Search .................... 108/27, 154, 157; 403/322, 320, 314; 248/188, 222.3, 231.3

[56] References Cited

U.S. PATENT DOCUMENTS

| 4,003,320 | 1/1977 | Owens et al. | 108/157 |
| 4,754,714 | 7/1988 | Drumm | 108/157 |
| 4,805,541 | 2/1989 | Drane et al. | 108/27 |
| 4,854,016 | 8/1989 | Rice | 248/231.3 X |
| 4,905,612 | 3/1990 | Apissomian | 108/157 |
| 4,941,413 | 7/1990 | Vanderminden | 108/157 |
| 5,188,324 | 2/1993 | Joseph et al. | 248/222.3 |

Primary Examiner—Jose V. Chen
Attorney, Agent, or Firm—J. Bennett Mullinax; Hardaway Law Firm

[57] ABSTRACT

An apparatus for securing a glass table top to a table rim, the apparatus providing a first ledge and a second ledge, the ledges rotating into respective gaps, thereby securing the table top within the rim. The apparatus further provides a spacing member which additionally secures the table top within the frame, the apparatus providing a prong for attachment to a table leg.

4 Claims, 3 Drawing Sheets

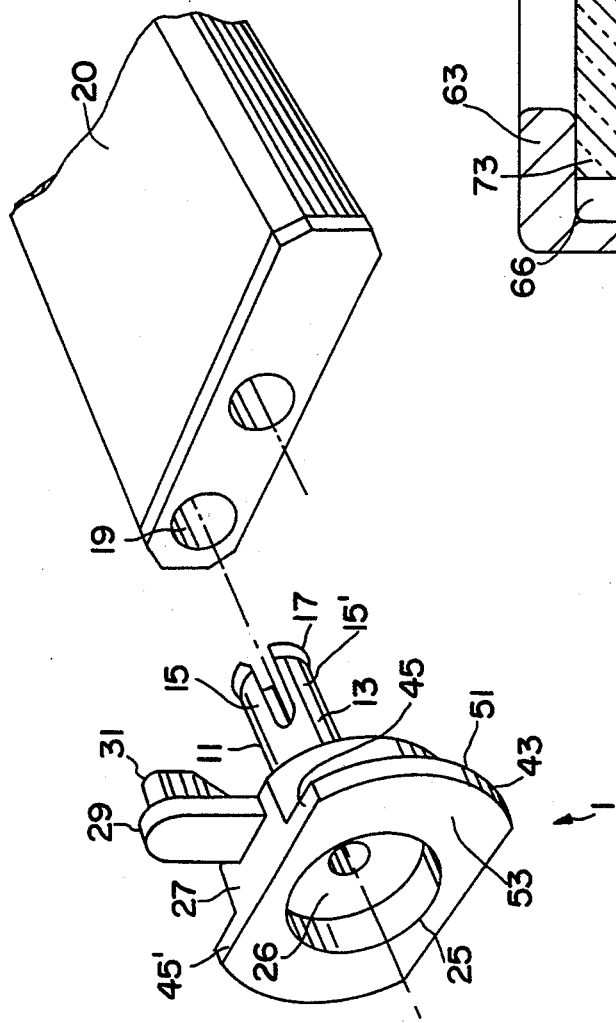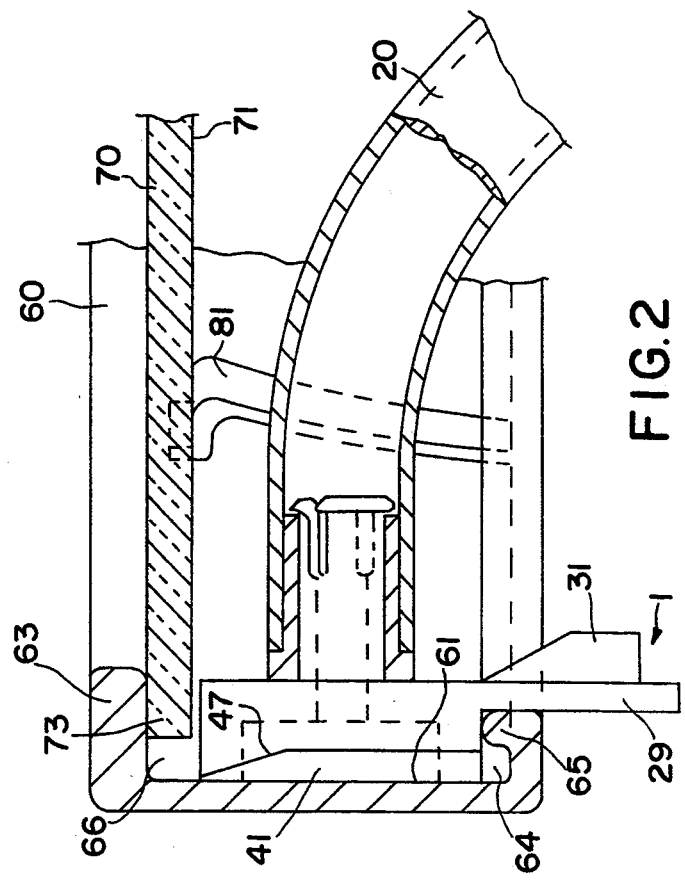

RIM LOCK APPARATUS

BACKGROUND OF THE INVENTION

This invention is directed towards an apparatus for attaching a table leg to a table having a removable table top housed within a table rim.

U.S. Pat. No. 4,624,598 to Gabriel discloses a table locking plug useful for securing table legs to outdoor furniture. The plug provides the table top with a pair of deformable ears to support a glass table top. However, over time and exposure to sun and temperature extremes, such an apparatus may become brittle. In addition, seasonal assembly and disassembly of an outdoor table may lead to breakage of flexible extensions which are used to support a table top.

Therefore, there is room for variation as well as improvement within the art of locking apparatuses for connecting a table leg to a table top.

SUMMARY OF THE INVENTION

It is an object of this invention to provide a rim locking apparatus which accommodates variations in thickness of a table tip surface.

It is a further object of this invention to provide a rim locking apparatus which is capable of repeated assembly and disassembly with a table.

It is a further and more particular object of this invention to provide a rim locking apparatus in which the engaging surfaces are resistant to breakage and fatigue.

These as well as other objects of the invention are provided by a rim locking apparatus comprising a cylinder having a front and a back, a portion of the length of the cylinder terminating in a flattened edge; a handle carried by the edge of the cylinder, an upper surface of the handle flush with the cylinder front; engaging means carried by a front of the cylinder for attaching the rim lock apparatus to a support; a first arcuate ledge, the first ledge being an extension of the cylinder and a rear of the ledge being flush with the cylinder back; and a second arcuate ledge, the second arcuate ledge being an extension of the cylinder, a rear of the ledge being flush with the cylinder back; wherein the rim lock apparatus is placed within an inner perimeter of a table rim, the rim lock apparatus being rotated 90°, the first arcuate lip of the first ledge engaging a gap between the rim and a table top, the ledge engaging the inner table rim and an outer perimeter of the table top, the outer surface of the cylinder simultaneously engaging a bottom of the table top, the second ledge engaging a groove defined by an extension of the bottom of the table rim, the attachment means securing the rim lock apparatus to a support structure for holding a table top and rim.

BRIEF DESCRIPTION OF THE DRAWINGS

FIG. 1 of the drawings is a rear perspective view of a preferred embodiment of the rim lock apparatus in accordance with the present invention.

FIG. 2 of the drawings is a cross-sectional view of the apparatus of FIG. 1 attached to a table leg and placed in an unsecured position within a table rim.

DETAILED DESCRIPTION

In accordance with this invention, it has been found that a rim lock apparatus for attaching a table top to a rim of a table having a pair of engaging means carried by a spacing member, the spacing member further defining a table engaging surface and a rim engaging surface can be provided.

Figure 6:
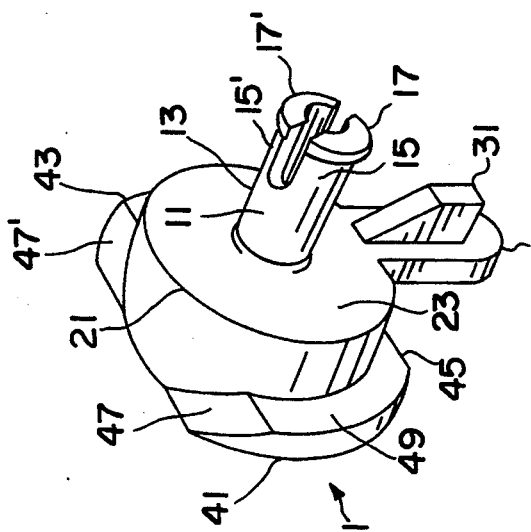
FIG. 6 of the drawings is a front perspective view of the rim lock apparatus.
Figure 5:
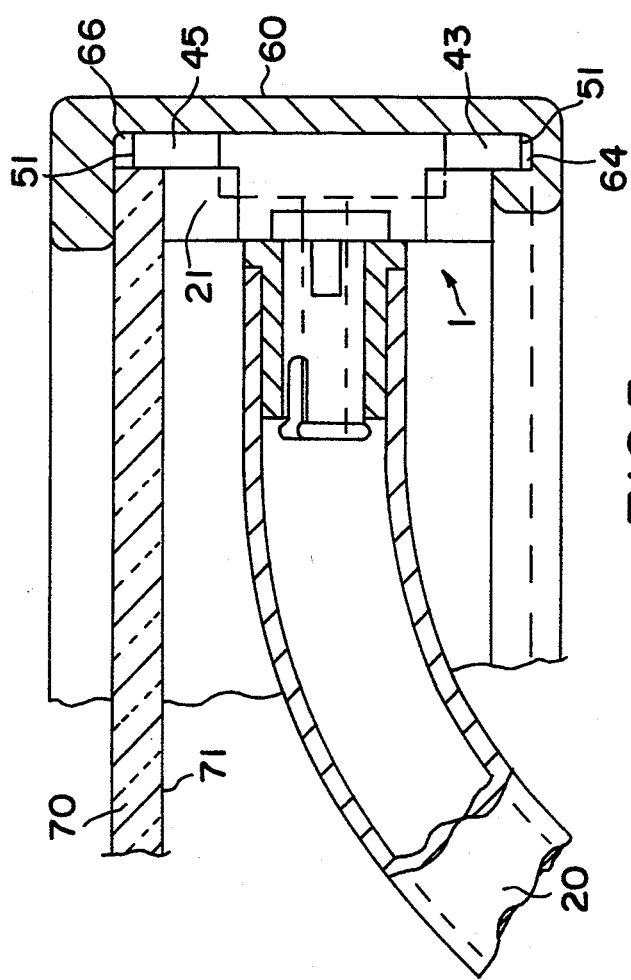
FIG. 5 of the drawings is a sectional view along line 5—5 as seen in FIG. 4.

In reference to FIGS. 1 and 6 of the drawings, a preferred embodiment is shown of a rim locking apparatus for securing a glass or plastic top table to the rim of a table, the apparatus further providing an attachment means for a table leg. Rim lock apparatus 1 has a front surface 23 and a rear surface 25. Front surface 23 defines a table leg attachment means 11. As best seen in relation to FIGS. 1 and 2, the preferred embodiment of attachment means 11 is comprised of a tubular extension 13 which terminates into a pair of resilient prongs 15 and 15' at a free end. Prongs 15 and 15' further define an arcuate shaped collar 17 along the exterior surface of prongs 15 and 15'. Attachment means 11 secures the rim lock apparatus 1 by the insertion of tubular extension 13 into a mated receptacle 19 of a table leg 20 as best seen in FIG. 2. Attachment means 11 permits the rotation of rim lock apparatus 1 about the table leg 20. Numerous well know equivalent means for attaching the rim lock apparatus to a table leg would suffice and include screws, anchors, brads, all of which permit a rotatable attachment means.

Attached to a first end of the leg attachment means 11 is a spacing member illustrated as cylinder 21 having a front surface 23 and a rear surface 25, a portion of the cylinder terminating in a flat edge 27. Attached to edge 27 is a perpendicular handle 29, the front surface of the handle further defining a stop 31. Rear surface 25 further defines a recessed area 26, area 26 in communication with a bore passing through attachment means 11.

The rear surface 25 of cylinder 21 also defines a pair of identical, oppositely spaced arcuate ledges 41 and 43 each ledge being an arcuate extension of the outer circumference of cylinder 21.

The first ends 45 and 45' of ledges 41 and 43 respectively terminates flush with cylinder edge 27. A second end of each ledge 41 and 43 terminates in a reduced thickness, tapering lip 47 and 47', the terminus of each lip tapering flush with a portion of the outer surface of cylinder 21, each lip having a front 49, an arcuate top surface 51, and a back 53, the lip back 53 being flush with the back surface 25 of cylinder 21. As best seen in reference to FIGS. 2 through 5, rim lock apparatus 1, attached to table leg 20, is placed against the inner perimeter 61 of a table top rim 60. Table rim 60 defines an upper rim 63, a lower U-shaped groove 64, groove 64 defined by an inner extension 65 of the table rim 60.

Rim lock apparatus 1, carrying attached table leg 20, is placed so that the back cylinder surface 25 is pressed against the inner perimeter of rim 61, handle 29 projecting away from the lower table surface 71 of table 70. Flat cylinder edge 27, associated with and defined below handle 29, permits the positioning of the rim lock apparatus 1 within the inner rim perimeter 61. Handle 29 is used to rotate the rim lock apparatus 90°, the direction of rotation i.e., clockwise or counterclockwise, depending upon the relative position of table leg 20 to the rim lock apparatus.

Figure 3:
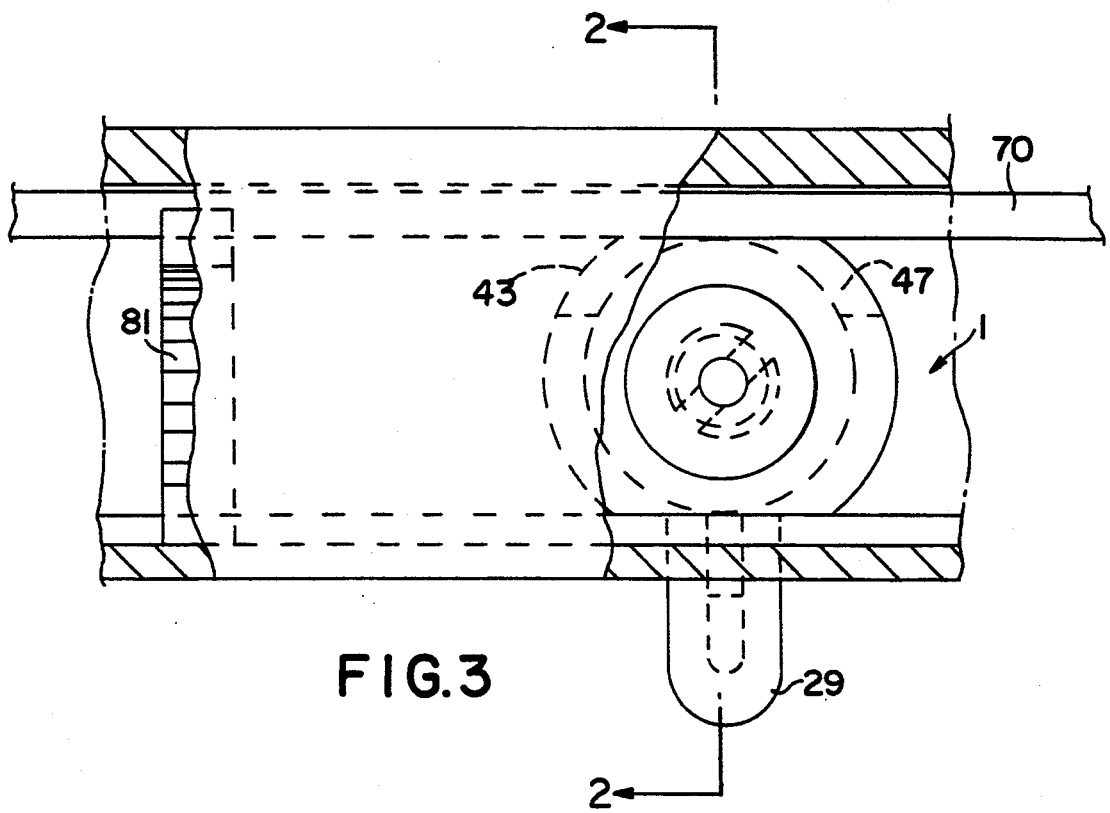
FIG. 3 of the drawings is a rear view in partial section similar to FIG. 1 in a first unsecured position within a rim of a table top.
Figure 4:
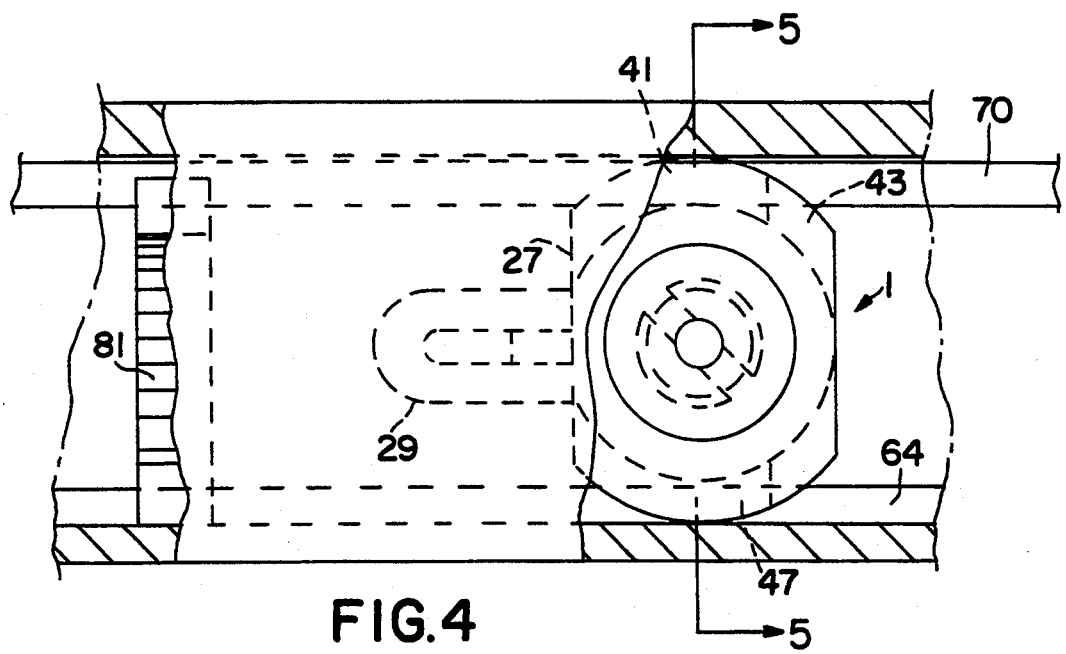
FIG. 4 of the drawings is a rear view similar to that of FIG. 3, with the rim lock apparatus rotated 90° into a locking position.

In reference to FIGS. 2 through 4, as rim lock apparatus is initially engaged, lip 47 is inserted into a gap 66 maintained between the circular edge 73 of table top 70 and the inner perimeter 61 of table rim 60. As the rotation of rim lock apparatus 1 progresses, lip 47 further engages gap 66 defined between the table top perimeter and rim 60, thereby wedging ledge 41 within the gap 66. Simultaneously, ledge 43 is positioned within and engages groove 64 of table rim 60, the rim lock apparatus 1 occupying the engaged position as seen in FIG. 4.

When the rim lock apparatus 1 is in the engaged position, the bottom of the table top is supported by an outer portion of cylinder 21. A second outer portion of cylinder 21 engages rim extension 65, thereby firmly securing the rim lock apparatus and associated table top within the table rim 60.

To facilitate the positioning of the rim lock apparatus, table top 70 is positioned within rim 60 and held in place by a series of clips 81. One end of clip 81 provides a spacing means for maintaining gap 66 between the outer circumference of the table top and the inner rim. Gap 66 being defined and maintained facilitates the engagement of ledge 41 between the table top 70 and rim 60.

Rim lock apparatus 1 is preferably constructed of a plastic which is light weight and has sufficient resiliency such that the rim lock apparatus can be rotated into the desired engaged position. A plastic or nylon material is preferable in that the rim lock apparatus can protect a glass table top surface from injury or scratching. It is readily apparent that the height of cylinder 21 is sufficient to permit handle 29 to clear the table rim extension 65 which defines groove 66 and that the diameter of cylinder 21 permits the proper spacing of ledge 41 & 43.

Rim lock apparatus 1 provides a reversible engaging means for securing a leg to a rim of a glass top table. Attachment of the rim lock apparatus to the leg is reversible as are the securing means provided by the rim lock apparatus for securing the table top within the table rim. As a result, table assembly can be assembled and disassembled with ease. The securing means provided by the rim lock apparatus is not subject to wear, stripping or fatigue as are other attachment means such as clips, screws or bolts. In addition, the rim lock apparatus requires no tools thereby facilitating its use by retail purchasers of tables. The preferred material of a plastic polymer is safe for use with glass top tables, reducing the risk of scratches and breakage. Additionally, the rim lock apparatus is compatible with popular acrylic and other plastic top tables which often vary slightly in thickness and uniformity. The resilient nature of the rim lock apparatus accounts for these slight variations and provides a securing means which is both unobtrusive and versatile.

The above description and drawings are exemplary in nature in that various modifications and changes may be made without departing from the spirit and scope of the present invention as defined by the following appended claims.

That which is claimed:

1. A rim lock apparatus for securing a table top to a rim positioned around the table top wherein a first gap exists between the rim and the outer perimeter of the table top and a second gap is defined by a bottom portion of the rim, said rim lock apparatus comprising:
   a first ledge for engaging the first gap;
   a second ledge for engaging said second gap;
   a cylindrical spacing member having a rear surface and a front surface carrying said first ledge on said rear surface of said spacing member, said spacing member further defining a first support member for engaging the surface of a table top;
   a second support member for engaging said rim, said second support member defined by said rear surface of said spacing member;
   a second ledge for engaging said second gap; and
   wherein engaging said first and second ledges with said first and second gaps, respectively, can be accomplished without substantial deformation of said rim lock.

2. The rim lock apparatus according to claim 1 wherein said first support means and said second support means are defined on opposing sides of said spacing member.

3. The rim lock apparatus according to claim 1 wherein said apparatus further defines a handle carried by said spacing member for engaging said rim lock mechanism.

4. A rim lock apparatus for securing a table top within a rim positioned around the table top and wherein a first gap exists between the rim and the outer perimeter of the table top and a second gap is defined by a bottom portion of the rim, said rim locking apparatus comprising:
   a first engaging ledge;
   a second engaging ledge;
   a cylindrical spacing member having a first surface for engaging table top and a second surface for engaging rim, said first engaging ledge being carried on said first surface;
   wherein, said first ledge comes into engagement with the first gap simultaneously with said second ledge coming into engagement with the second gap, thereby securing said table top within said rim.

* * * * *